Figure 1:
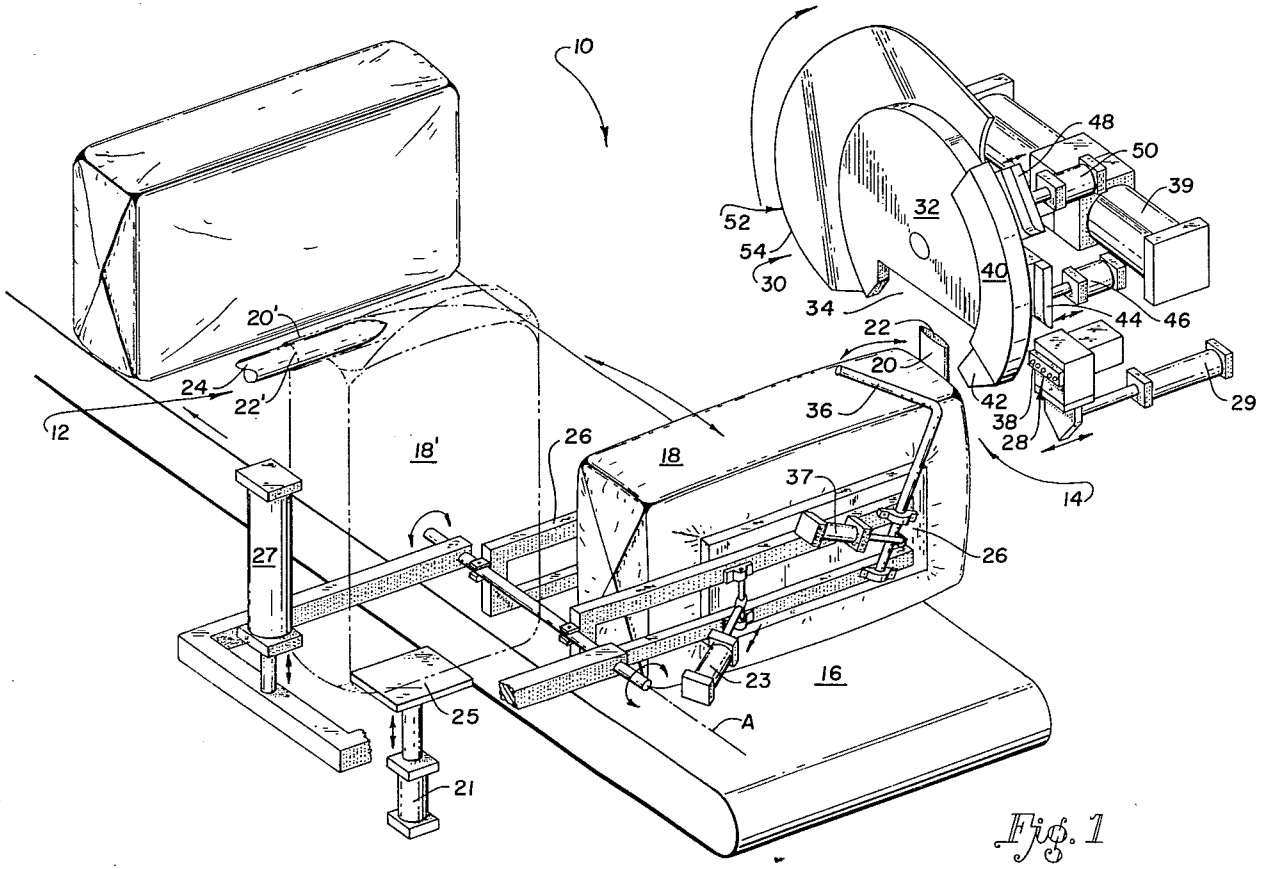

DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED DECEMBER 2, 1975

941 O.G. 5

T941,002
APPARATUS FOR AUTOMATICALLY SEALING VALVE BAGS

Merton L. Dibble, Rte. 13, Kingsport, Tenn. 37664

Filed June 28, 1974, Ser. No. 484,363
Int. Cl. B65b *51/24, 63/00*
U.S. Cl. 53—124 A
1 Sheet Drawing. 11 Pages Specification

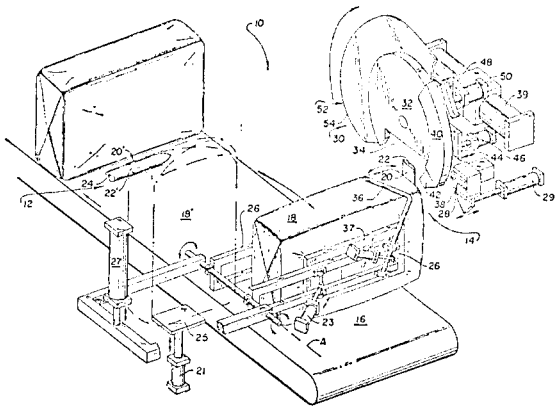

The apparatus automatically seals a valve bag that is enclosed at the top, bottom and on all sides except for a flexible valve sleeve that extends parallel to and along the bag top and into which a filling spout is inserted. The apparatus includes a lifting member for lifting a filled valve bag to a predetermined extent to take the weight of the bag off the filling spout; clamping arms for clamping and supporting the filled valve bag in its vertical upright filling position and then for pivoting the bag to a horizontal position; a wiper device for wiping across the uppermost side of the valve bag in its horizontal position and to move against the flexible valve sleeve to flatten both; an adhesive applicator for applying adhesive to a portion of the bag top adjacent the valve sleeve; a rotary turret; a heating device on the rotary turret for heating the adhesive impregnated interior portions of the valve sleeve; a clamping arrangement on the rotary turret for sealing the valve sleeve together; a folding member on the turret for folding the valve sleeve back over itself and against the adhesived portion of the bag top; and a holding portion on the folding member for holding the valve sleeve against the bag top until sealed thereto.

APPARATUS FOR AUTOMATICALLY SEALING VALVE BAGS

Original Filed June 28, 1974